United States Patent [19]

Cosson et al.

[11] Patent Number: 5,898,782
[45] Date of Patent: Apr. 27, 1999

[54] METHOD AND SYSTEM TO SECURE THE TRANSMISSION OF DATA ELEMENTS BETWEEN A SENSOR AND A RECORDER

[75] Inventors: Eric Cosson, Brest; Gilles Craignou, Le Relecq Kerhuon; Christian Morel, Brest, all of France

[73] Assignee: Thomson-CSF, Paris, France

[21] Appl. No.: 08/640,484

[22] Filed: May 1, 1996

[30] Foreign Application Priority Data

May 12, 1995 [FR] France .................................. 95 05661

[51] Int. Cl.$^6$ ........................................................ H04L 9/00
[52] U.S. Cl. .............................. 380/49; 380/9; 380/23; 380/25; 380/46; 380/28; 380/59
[58] Field of Search ............................ 380/4, 9, 28, 44, 380/46, 49, 50, 59, 23, 25, 30; 340/825, 31, 34

[56] References Cited

U.S. PATENT DOCUMENTS

| | | |
|---|---|---|
| 5,321,753 | 6/1994 | Gritton . |
| 5,497,419 | 3/1996 | Hill ............................................. 380/9 |

FOREIGN PATENT DOCUMENTS

| | | |
|---|---|---|
| 42 02 583 | 4/1993 | Germany . |

OTHER PUBLICATIONS

Eascon '79—Proceedings of IEEE Electronics and Aerospace Systems Convention, Arlington (US), Sep. 25–27, 1978 New York (US), pp. 661–662, G.J. Simmons "Message Authentication Without Secrecy: A Secure Communications Problem Uniquely Solvable by Asymmetric Encryption Techniques."

Proceedings of 1990 International Carnahan Conference on Security Technology: Crime Countermeasures, Lexington (US), Oct. 10–12, 1990 New York (US), pp. 29–32, L. Cooke "Sensor Technology and Signal Analysis: High Security Encryption Supervision."

*Primary Examiner*—Bernarr E. Gregory
*Attorney, Agent, or Firm*—Oblon, Spivak, McClelland, Maier & Neustadt, P.C.

[57] ABSTRACT

Disclosed are a method and a system for the securing of the transmission of data elements between a sensor delivering pulses and a recorder processing these pulses. This method and system are applicable especially to a chronotachograph for heavy road vehicles. The principle of the disclosed method relies on a permanent exchange of enciphered data elements between a recorder module comprising the recorder and a sensor module comprising the sensor. The exchange is done at the initiative of the recorder module which sends command messages $X[C(M_C)]$ enciphered according to a first code C to the sensor module. The sensor module acknowledges the command and then, in turn, generates enciphered return messages $X[C'(M_R)]$, either in order to indicate the acknowledgement of the command or to transmit pulses from the sensor with a view to their processing by the recorder. The recorder module then deciphers and verifies the return messages ($M_R$) firstly to check the coherence of these messages and secondly to restore the transmitted pulses to the recorder. The disclosed method and system enable the detection and recording of any attempt to falsify the link between the sensor and the recorder.

12 Claims, 3 Drawing Sheets

METHOD AND SYSTEM TO SECURE THE TRANSMISSION OF DATA ELEMENTS BETWEEN A SENSOR AND A RECORDER

BACKGROUND OF THE INVENTION

1. Field of the Invention

An object of the present invention is a method by which it is possible to secure the transmission of data elements between a sensor delivering pulses and a recorder processing these pulses, as well as a system to implement the method.

The field of application that is a particular object of the invention is that of chronotachographs used in heavy road vehicles to verify their speed of movement and check compliance by truck drivers with the regulations on time.

2. Description of the Prior Art

At present, chronotachographs consist essentially of a tachometric sensor that transmits one or more pulses by a differential electrical link to a recorder, for example a disk, each time that the wheels of the heavy road vehicle have made one revolution. By examining the period of repetition of the recorded pulses, the speed of the vehicle in motion is deduced.

The sensor and the recorder are generally separated by a distance of 2 to 10 meters.

For the time being, there is no security system provided on existing chronotachographs. This enables all types of fraudulent activity: it is possible in particular to set up a parallel connection of a false sensor on the link between the existing sensor and recorder. This false sensor modifies (in this case reduces) the number of pulses transmitted.

The aim of the present invention is to secure the transmission of data elements between the sensor and the recorder, and to do this at several levels:

First of all it is sought to secure the transmission at the level of the link, on the one hand to prevent false information from being transmitted to the recorder and, on the other hand, to prevent a falsified sensor from being connected instead of the one that has been certified by the checking organization.

More specifically, an aim of the invention is to detect and record any attempt to falsify the link between the sensor and the recorder.

Then, with regard to the information transmitted, the invention is designed to prevent the data elements of the sensor from being modified.

The present invention may be extended to any type of transmission between a sensor delivering pulses and a recorder in charge of processing them.

SUMMARY OF THE INVENTION

To achieve the above aim, an object of the present is a method for the securing of the transmission of data elements between a sensor delivering pulses and a recorder processing these pulses, wherein said method comprises the following steps:

setting up an exchange of enciphered data elements between a recorder module comprising said recorder and a sensor module comprising said sensor through a series link, said data elements comprising digital command messages generated by the recorder module and enciphered by a first enciphering code C, digital return messages generated by the sensor module, either in response to command messages received and deciphered or for the transmission of said pulses with a view to their processing, the return messages being enciphered by a second enciphering code C';

performing a deciphering and a checking of the return messages received by the recording module to permanently validate the integrity of the link and of the data elements.

The command messages used may be of several types:

There may be, for example, at least one message requesting sensor identification, messages requesting modification of-the first enciphering code C and/or of the second enciphering code C', or again link testing messages. The return messages coming from the sensor module are then adapted accordingly and the verification step enables the checking of their coherence.

Advantageously, the enciphered data elements exchanged between the recording module and the sensor module are modulated before transmission by a pulse width modulation with two states of a fixed frequency carrier, and are demodulated at reception.

Furthermore, an object of the present invention is also a system to implement the securing method, said system comprising a recorder module, a sensor module and a series link between the recorder module and the sensor module, wherein the recorder module comprises means to generate the enciphered digital command messages, means to decipher the return messages and means to check the return messages, wherein the sensor module comprises means to decipher the command messages received and means to generate the enciphered return messages.

BRIEF DESCRIPTION OF THE DRAWINGS

Other characteristics and advantages of the present invention shall appear from the following description, given with reference to the appended figures, of which.

MORE DETAILED DESCRIPTION

The principle of the securing method according to the invention relies on a permanent exchange of enciphered data elements between a recorder module comprising the recorder and a sensor module comprising the sensor.

According to the invention, the exchange is carried out on the initiative of the recorder module which sends enciphered command messages to the sensor module. The sensor module acknowledges the commands and then, in its turn, generates enciphered return messages either to indicate the acknowledgement of the command or to transmit pulses from the sensor with a view to their processing by the recorder. The recorder module then deciphers and verifies the return messages in order to firstly check the coherence of these messages and secondly restore the pulses to the recorder.

Figure 1:
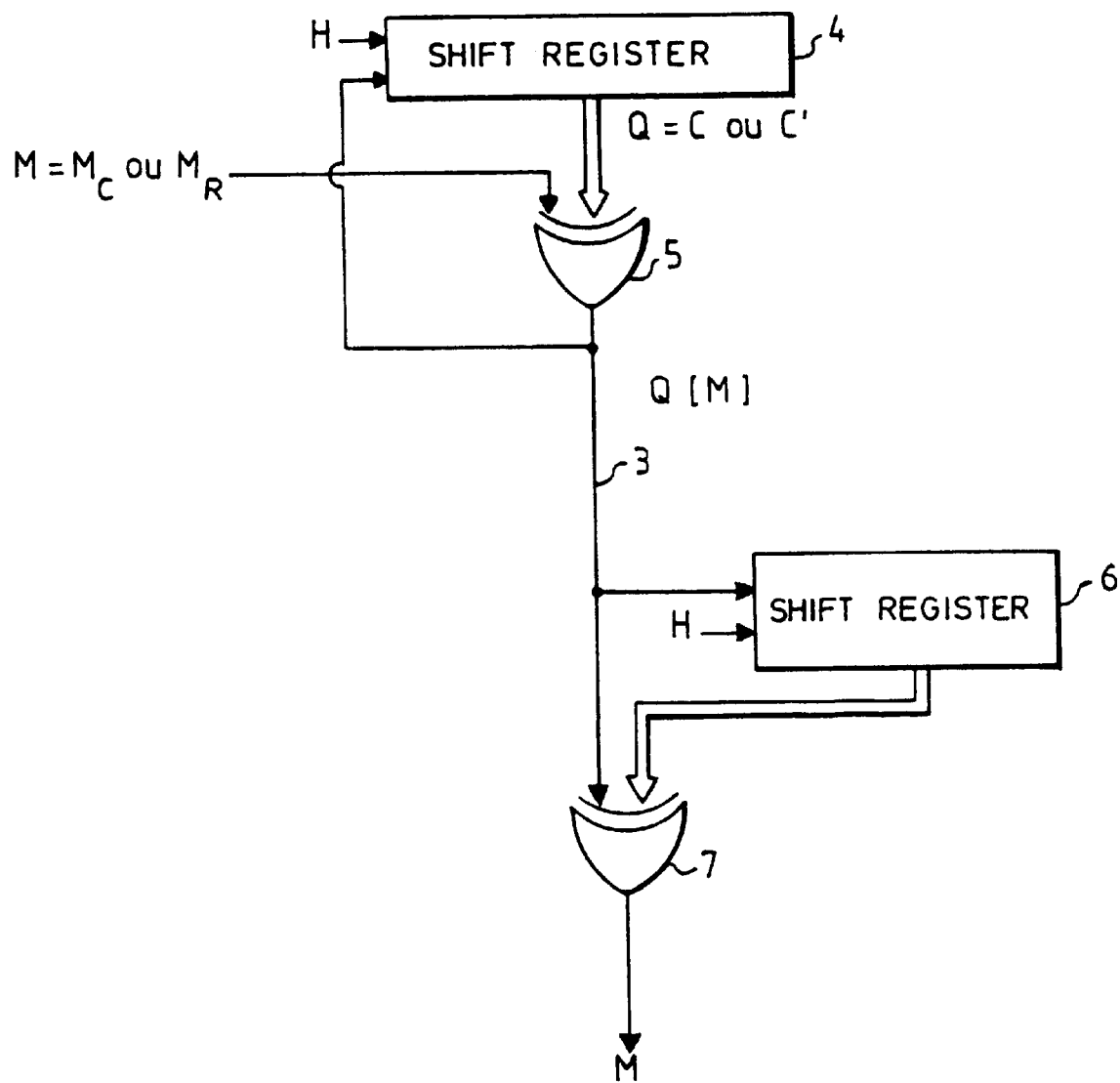
FIG. 1 illustrates the general principle of the enciphering and deciphering according to a code generated by a reversible polynomial.

Preferably, for the enciphering and deciphering, codes generated by reversible polynomials are used. Hereinafter, referring to FIG. 1, the general principle of the enciphering/deciphering of any message M is recalled.

A shift register 4 with a size N working at a rate H enables the generation of a pseudo-random code Q whose sequence has the size $2^N-1$. An OR gate 5 receives firstly the enciphering code Q and secondly the message M to be transmitted, and delivers an enciphered message Q[M] transmitted through the link 3. The output of the gate 5 is looped to the input of the register 4. At reception, another shift register 6 also working at the rate H receives the enciphered message Q[M] at input. The output of the register is delivered to another logic gate 7 also receiving the enciphered message. Consequently, the deciphered message M is received at output of the gate 7.

A detailed description is given here below of the principle of the method according to the invention with reference to FIGS. 2a and 2b which show a flow chart of operation for a possible system implementing the method according to the invention. More specifically, FIG. 2a illustrates the system at the level of the recorder module and FIG. 2b illustrates the system at the level of the sensor module.

Figure 2A:
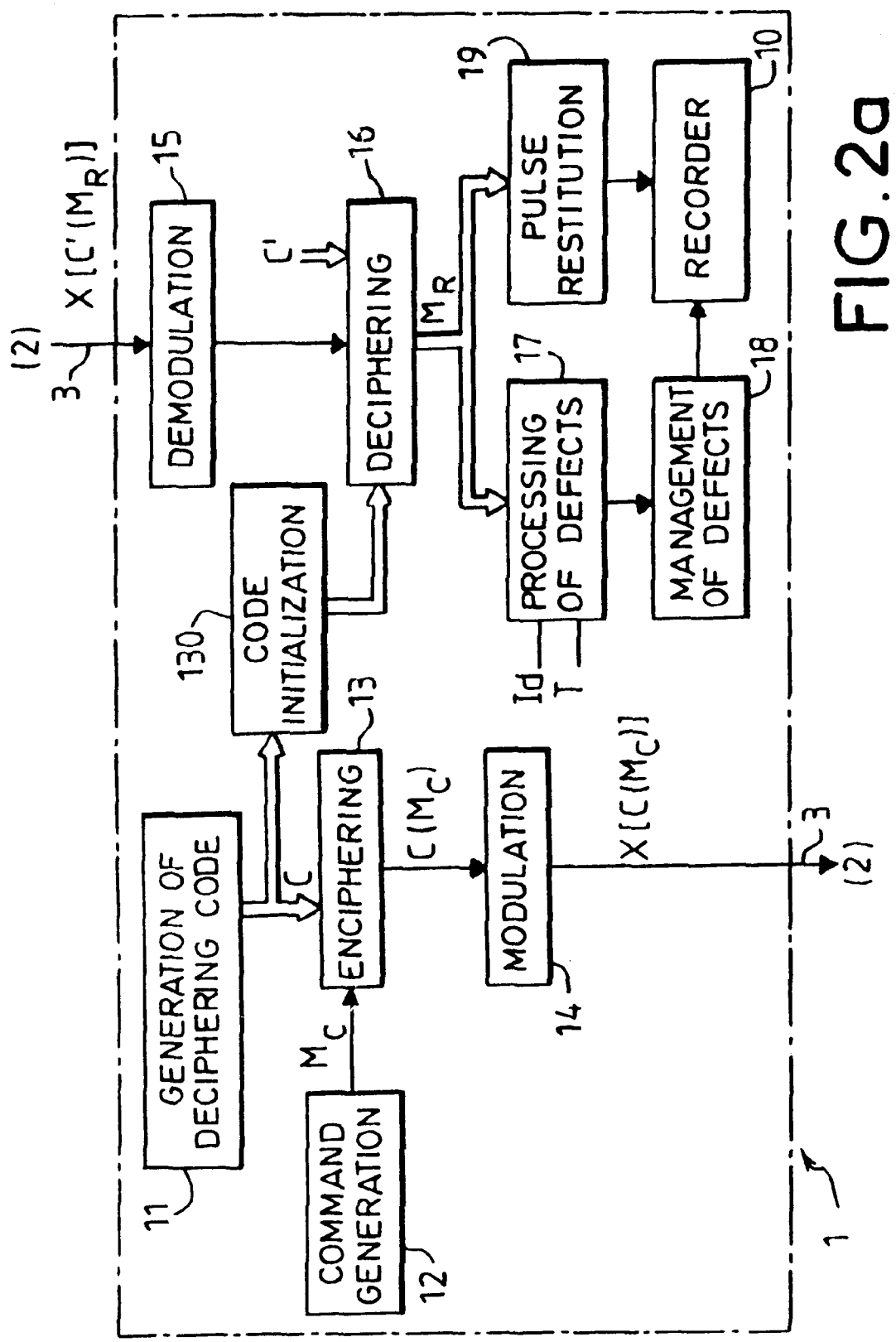
FIGS. 2a and 2b give a view, in the form of a flow chart, of the working of a possible system implementing the method according to the invention on the recorder module side (FIG. 2a) and the sensor module side (FIG. 2b).
Figure 2B:
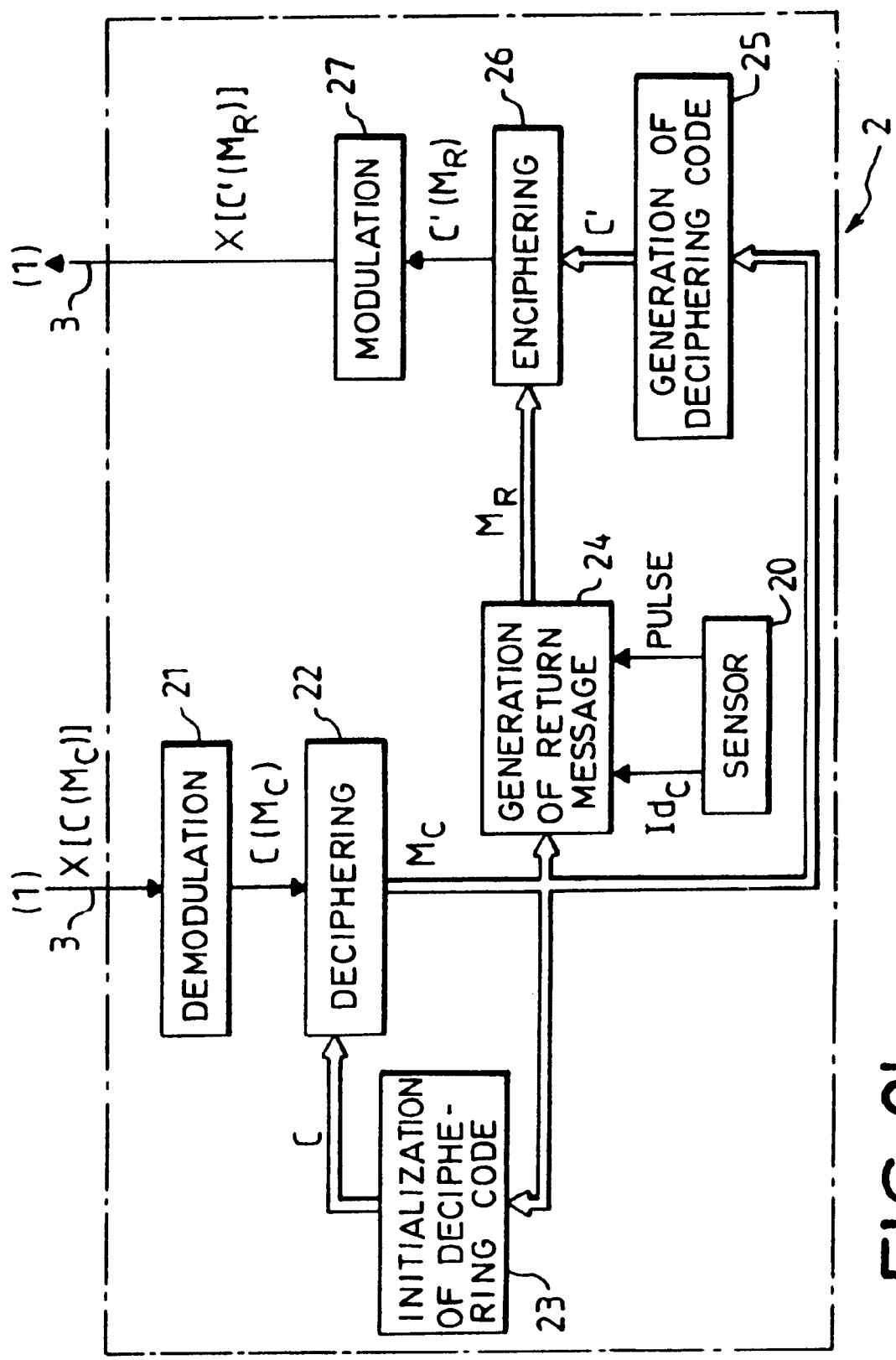

As can be seen in FIG. 2a, the recorder module 1 comprises, on the one hand, first means 11 to 14 enabling it to generate enciphered command messages and, on the other hand, second means 10 and 15 to 19 to check the return messages.

The first means comprise a module 11 to generate a first enciphering code C. This enciphering code is advantageously generated by a reversible polynomial.

A module 12 furthermore generates the command messages $M_c$ proper. These messages are then enciphered according to the first enciphering code C by an enciphering module 13, so as to deliver enciphered command messages $C(M_c)$.

These messages are advantageously modulated by a pulse width modulation with two states of a fixed frequency carrier, equal for example to 2 MHz. This means that it is not necessary to transmit the clock signal used to synchronize the circuits of the sensor module for the demodulation and the deciphering of the messages.

The enciphered and modulated command messages $X[C(M_c)]$ are then transmitted to the sensor module 2 by a differential type of series link 3 for example an RS 422 type series link.

Referring to FIG. 2b, the sensor module 2 then carries out a demodulation 21 of the messages received and then a deciphering 22 of the demodulated messages $C(M_c)$ obtained so as to return to the initial command messages $M_c$.

Depending oh the command messages received, the sensor module will perform certain tasks.

In a preferred embodiment of the invention, the command messages are of three types:

The command message may be, for example, a message requesting the identification of the sensor 20, in which case the sensor module, by means of a module 24, will generate a return message $M_R$ comprising an information element $Id_c$ identifying the sensor 20, for example its series number. This message may be sent at the beginning of the exchange, or periodically.

The message may also be a request for the initialization of the enciphering codes, the initialization code being conventionally generated by a pseudo-random sequence generator with a size N' that thus extends the size of the total resultant sequence. This operation herein is achieved by the module 11 which sends the modules 23, 25 and 130 the codes for the future exchanges. The enciphering modules 13 and 26 and the deciphering module 22 and 16 are then capable of interfacing with the new codes.

The message may be a link testing message. In this case, the module 24 generates simply a return message meeting this test.

Furthermore, apart from the return messages corresponding to responses to command messages, the module 24 also generates return messages comprising the pulse delivered by the sensor 20.

In any case, the return messages $M_R$ are also enciphered by an enciphering module 26, according to a second enciphering code C' generated by a module 25.

Like the first code C, the second code C' is advantageously generated by a reversible polynomial according to standard techniques.

Then the enciphered response messages are modulated by the module 27, and the messages obtained $X[C'(M_R)]$ ate transmitted through the series link 3.

Referring again to FIG. 2a, the return messages $X[C'(M_R)]$ received by the recorder module 1 are then demodulated by a demodulation module 15, and then deciphered by the deciphering module 16 as a function of the second enciphering code C'.

A step is then performed to verify the messages $M_R$ obtained. To do this, the recorder module 1 has a module 17 for processing transmission defects. This module 17 makes it possible to check the coherence of the messages received following a command. Should the command be a request for the identification of the sensor, this module 17 makes a check to find out whether the return message comprises an information element corresponding to a predetermined identification Id. This makes it possible to detect the connections of falsified sensors. Should the command be a request for reinitializing enciphering codes, the module 17 ascertains that the return message $M_R$ includes an information element pertaining to the acknowledgement of reinitialization. Should the command be a linking test, the module 17 ascertains that it receives a response at the end of a predefined period T.

A module 18 then enables the management of the defects that have been detected. For the application to the chronotachograph of heavy road vehicles, it may be planned that the detection of a defect, whatever its nature, will be expressed by an oscillation of the speedometer needle between, for example, 8 km/h and 20 km/h and/or by the flashing of the light that indicates the recording and the operation of the recording styluses, and/or by a plotting on the recorder disk.

In another embodiment, the processing of the return messages activates defects that will be identified specifically (sensor, link, data, etc.).

Furthermore, a module 19 enables the restitution, from the return message $M_R$, of the pulse sent out by the sensor 20 with a view to its processing by the recorder 10.

Certain alternative embodiments may be achieved without departing from the framework of the present invention. It is possible especially to provide for command messages other than those explained here above, with an adequate checking of the response of the sensor module.

What is claimed is:

1. A method for the securing of the transmission of data elements between a sensor delivering pulses and a recorder processing these pulses, wherein said method comprises the following steps:

exchanging enciphered data elements between a recorder module and a sensor module through a series link, said enciphered data elements comprising digital command messages generated by the recorder module and enciphered by a first enciphering code C, digital return messages generated by the sensor module, in response to command messages received and deciphered and for transmission of said pulses with a view to their processing, the return messages being enciphered by a second enciphering code C';

deciphering and checking of the return messages received by the recording module to permanently validate the integrity of the link and of the data elements.

2. A method according to claim 1, wherein the command messages include at least one message requesting identification of a sensor, the corresponding return message comprises an information element identifying the sensor relative to the sensor module generating the return message and the checking step consists in ascertaining that said information element corresponds to a predefined identification.

3. A method according to claim 2, wherein the message requesting identification of a sensor is sent periodically during the exchange of enciphered data elements.

4. A method according to claim 1, wherein the command messages include messages requesting reinitialization of the enciphering codes C and C', the corresponding return messages include an information element pertaining to the acknowledgement of the reinitialization and the verification step consists in ascertaining that the requested reinitialization has been acknowledged.

5. A method according to claim 4, wherein the messages requesting modification of the enciphering codes C and C' are sent out pseudo-randomly.

6. A method according to claim 1, wherein the command messages include messages for testing the link between the recorder module and the sensor module and the verification step consists in ascertaining that corresponding return messages have been transmitted at the end of a predefined period T.

7. A method according to claim 1, wherein the first and the second enciphering codes C and C' are each generated by a reversible polynomial.

8. A method according to claim 1, wherein the enciphered data elements exchanged between the recorder module and the sensor module are modulated before transmission by a pulse width modulation with two states of a fixed carrier frequency and are demodulated at reception.

9. A system to implement the securing method according to claim 1, comprising a recorder module, a sensor module and a series link between the recorder module and the sensor module, wherein the recorder module comprises means to generate the enciphered digital command messages, means to decipher the return messages and means to check the return messages, and wherein the sensor module comprises means to decipher the command messages received and means to generate the enciphered return messages.

10. A system according to claim 9, wherein the checking means comprise a module for the processing of the transmission defects and a module for the restitution of the pulses transmitted by the sensor with a view to their processing by the recorder.

11. A system according to claim 9, wherein the sensor is a tachometric sensor.

12. A system according to claim 11, wherein the sensor enables the measurement of the speed of the vehicle that contains it.

* * * * *